(12) United States Patent
Sowa et al.

(10) Patent No.: US 9,507,247 B2
(45) Date of Patent: Nov. 29, 2016

(54) PROJECTOR

(71) Applicant: SEIKO EPSON CORPORATION, Tokyo (JP)

(72) Inventors: Takeshi Sowa, Matsumoto (JP); Yuichiro Iwama, Shiojiri (JP)

(73) Assignee: SEIKO EPSON CORPORATION, Tokyo (JP)

( * ) Notice: Subject to any disclaimer, the term of this patent is extended or adjusted under 35 U.S.C. 154(b) by 105 days.

(21) Appl. No.: 14/656,116

(22) Filed: Mar. 12, 2015

(65) Prior Publication Data

US 2015/0277216 A1    Oct. 1, 2015

(30) Foreign Application Priority Data

Mar. 27, 2014    (JP) .................. 2014-065436

(51) Int. Cl.
*G03B 21/20* (2006.01)
*G03B 21/16* (2006.01)
*G03B 21/00* (2006.01)

(52) U.S. Cl.
CPC ......... *G03B 21/2053* (2013.01); *G03B 21/005* (2013.01); *G03B 21/16* (2013.01); *G03B 21/2026* (2013.01)

(58) Field of Classification Search
CPC .............. G03B 21/16; G03B 21/2026; G03B 21/2053
See application file for complete search history.

(56) References Cited

U.S. PATENT DOCUMENTS

| 8,436,545 B2 | 5/2013 | Goto et al. |
| 8,541,954 B2 | 9/2013 | Saka et al. |
| 2011/0221355 A1 | 9/2011 | Goto et al. |
| 2011/0221356 A1 | 9/2011 | Saka et al. |
| 2015/0177601 A1* | 6/2015 | Imai ............... G03B 21/142 353/85 |
| 2016/0018724 A1* | 1/2016 | Okamura ......... G03B 21/2013 353/85 |

FOREIGN PATENT DOCUMENTS

| JP | H02-230288 A | 9/1990 |
| JP | 2011-187368 A | 9/2011 |
| JP | 2011-187369 A | 9/2011 |

* cited by examiner

*Primary Examiner* — William C Dowling
(74) *Attorney, Agent, or Firm* — Oliff PLC

(57) ABSTRACT

A projector includes a discharge lamp and a discharge lamp drive section. The discharge lamp drive section is configured to selectively perform a first drive in which first drive power is supplied and a second drive in which second drive power higher than the first drive power is supplied in a first posture, and supply drive power not lower than third drive power and not higher than fourth drive power in a second posture in which optical axis intersects with horizontal plane, the third drive power is drive power with which one of the electrodes in the second posture is set to temperature corresponding to first temperature in the first drive in the first posture, and the fourth drive power is drive power with which one of the electrodes in the second posture is set to temperature corresponding to second temperature in the second drive in the first posture.

3 Claims, 5 Drawing Sheets

PROJECTOR

BACKGROUND

1. Technical Field

The present invention relates to a projector.

2. Related Art

In the past, there has been known a projector, which is provided with a light source, a light modulation device for modulating the light emitted from the light source in accordance with image information, and a projection optical system for projecting the light modulated by the light modulation device, and projects an image on a projection surface such as a screen. Further, there has been proposed a projector, which uses a discharge lamp as a light source and is capable of projecting an image while changing the posture (see, e.g., JP-A-2-230288 (Document 1)).

The projector (the projection liquid crystal display device) described in Document 1 is provided with a light source section including a discharge lamp, a modulation device adapted to modulate the light from the light source section, a projection optical device adapted to project the light thus modulated by the modulation device, and a projection direction changing device.

The discharge lamp has a pair of electrodes, wherein the axis along which the voltage is applied to the pair of electrodes (hereinafter referred to as a voltage applying axis) is perpendicular to the optical axis of the projection optical device, and by applying the voltage between the pair of electrodes, the discharge lamp emits light. Further, the projector is configured so as to be able to perform projection even if the angle of the optical axis of the projection optical device with respect to the installation surface is changed in the state in which the voltage applying axis is always kept horizontal.

However, in the projector described in Document 1, in the posture in which the voltage applying axis of the discharge lamp is oblique to the horizontal plane, namely the posture in which the voltage applying axis extends along the vertical direction, for example, the discharge lamp becomes deteriorated. Specifically, in the discharge lamp, which emits light due to the arc discharge generated between the pair of electrodes, there occurs convection in the discharge space due to the occurrence of the arc discharge, and the upper side in the vertical direction becomes higher in temperature than the lower side due to the convection. In other words, compared to the case in which the voltage applying axis is horizontal, the electrode located on the upper side becomes higher in temperature, and the electrode located on the lower side becomes lower in temperature. Therefore, in the discharge lamp, a drop in luminance, a flicker, and so on occur due to excessive melting of the electrode excessively raised in temperature, instability in discharge in the electrode excessively lowered in temperature, and so on.

Therefore, although in recent years, a projector, which can perform projection even in the posture in which the voltage applying axis of the discharge lamp is oblique to the horizontal plane has been demanded in order to broaden the scene of use of projectors, in the projector described in Document 1, there is a problem that the discharge lamp becomes deteriorated in the posture in which the voltage applying axis is oblique to the horizontal plane.

SUMMARY

An advantage of some aspects of the invention is to solve at least a part of the problems described above, and the invention can be implemented as the following aspects or application examples.

A projector according to this application example includes a discharge lamp having a pair of electrodes disposed along an optical axis, and a discharge lamp drive section adapted to supply drive power to the discharge lamp to drive the discharge lamp, the discharge lamp drive section is configured to selectively perform a first drive in which a first drive power is supplied to the discharge lamp and a second drive in which a second drive power higher than the first drive power is supplied to the discharge lamp in a first posture of the projector in which the optical axis of the discharge lamp extends along a horizontal plane, and supply drive power not lower than a third drive power and not higher than a fourth drive power to the discharge lamp in a second posture of the projector in which the optical axis intersects with the horizontal plane, the third drive power is drive power with which one of the pair of electrodes located on a lower side in a vertical direction in the second posture is set to temperature corresponding to first temperature of the electrode in the first drive in the first posture, and the fourth drive power is drive power with which one of the pair of electrodes located on an upper side in the vertical direction in the second posture is set to temperature corresponding to second temperature of the electrode in the second drive in the first posture.

As described above, the discharge lamp becomes higher in temperature on the upper side in the vertical direction than on the lower side in the vertical direction due to the convection caused by the arc discharge. Therefore, although the temperature of the pair of electrodes becomes roughly homogenized in the first posture of the projector in which the optical axis extends along the horizontal plane, in the second posture, the temperature of the electrode located on the upper side becomes higher than the temperature of the electrode in the first posture, and the temperature of the electrode located on the lower side becomes lower than the temperature of the electrode in the first posture.

Here, it is assumed that the first posture in which the optical axis extends along the horizontal plane includes postures, in which the optical axis has some angle with the horizontal plane, as long as the pair of electrodes are roughly equivalent in temperature in those postures besides the case in which the angle of the optical axis with respect to the horizontal plane is 0°.

According to this configuration, the discharge lamp drive section selectively performs the first drive in which the first drive power is supplied to the discharge lamp and the second drive in which the second drive power is supplied to the discharge lamp in the first posture. Thus, since the first drive power and the second drive power are set so as to obtain the electrode temperature at which the deterioration of the electrode is suppressed in the first posture, the projector can project the image while decreasing the light emission luminance of the discharge lamp in the case of performing the first drive, and increasing the light emission luminance of the discharge lamp in the case of performing the second drive, for example. In other words, it is possible for the projector to project the image in the energy saving mode for suppressing the power consumption in the case of supplying the discharge lamp with the first drive power, and project the brighter image in the high luminance mode in the case of supplying the second drive power to the discharge lamp, for example.

Further, the discharge lamp drive section supplies the drive power not lower than the third drive power and not higher than the fourth drive power described above to the discharge lamp in the second posture. Thus, the discharge lamp is put on at the temperature at which the deterioration of the electrodes is suppressed even in the second posture.

Therefore, it becomes possible to provide the projector projecting an image with a desired brightness for a long period of time in both of the first posture and the second posture.

In the projector according to the application example described above, it is preferable that the second posture is a posture in which the optical axis extends along the vertical direction.

According to this configuration, the deterioration of the discharge lamp is suppressed even in the case of disposing the discharge lamp so that the optical axis extends along the vertical direction. Therefore, it becomes possible to provide the projector capable of stably projecting a landscape image in the first posture and a portrait image in the second posture, for example, for a long period of time.

In the projector according to the application example described above, it is preferable that the discharge lamp includes a plurality of discharge lamps having respective optical axes disposed along one direction, and the discharge lamp drive section is configured to selectively supply the first drive power and the second drive power to the plurality of discharge lamps in the first posture, and supply the drive power not lower than the third drive power and not higher than the fourth drive power to the plurality of discharge lamps in the second posture.

According to this configuration, the projector is provided with a plurality of discharge lamps arranged so that the optical axes extend along one direction, and the drive power described above is supplied to the plurality of discharge lamps in accordance with the posture of the projector. Thus, it becomes possible to provide the projector capable of projecting an image improved in brightness for a long period of time in both of the first posture and the second posture.

BRIEF DESCRIPTION OF THE DRAWINGS

The invention will be described with reference to the accompanying drawings, wherein like numbers reference like elements.

DESCRIPTION OF AN EXEMPLARY EMBODIMENT

Hereinafter, a projector according to an embodiment of the invention will be explained with reference to the accompanying drawings.

The projector according to the present embodiment modulates light, which has been emitted from a discharge lamp as a light source, in accordance with image information, and then projects the light thus modulated on a screen in an enlarged manner. Further, the projector according to the present embodiment is configured so as to be able to be installed in a horizontal mounting posture for projecting a landscape image on a projection surface and a vertical mounting posture for projecting a portrait image on the projection surface. The horizontal mounting posture corresponds to a first posture, and the vertical mounting posture corresponds to a second posture.

Principal Configuration of Projector

Figure 1:
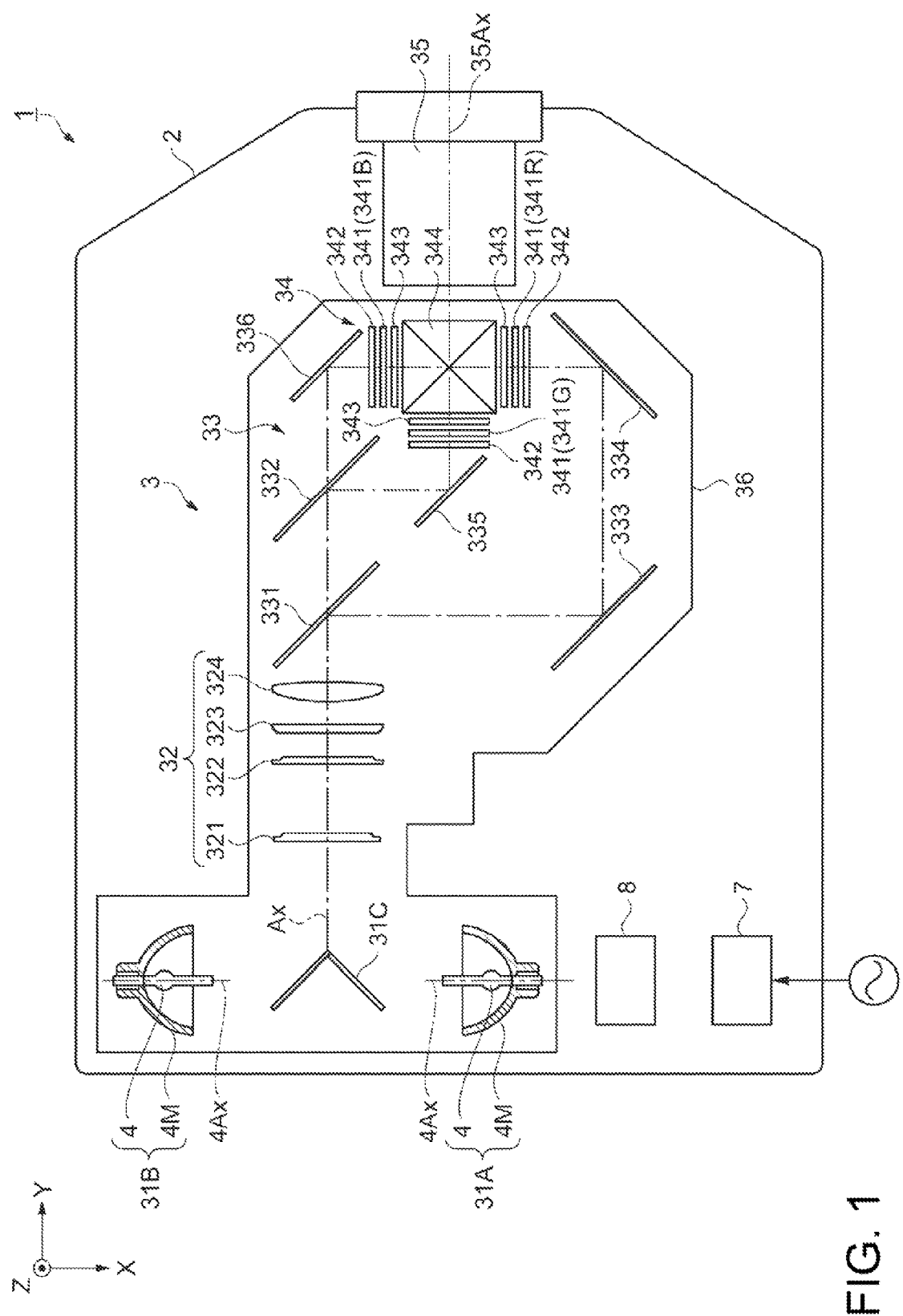
FIG. 1 is a schematic diagram showing a principal configuration of a projector according to an embodiment of the invention.

FIG. 1 is a schematic diagram showing a principal configuration of the projector 1 according to the present embodiment.

As shown in FIG. 1, the projector 1 is provided with an exterior housing 2 for constituting the exterior, a control circuit section (not shown), an optical unit 3 including discharge lamps 4, a direct-current power supply device 7, and a discharge lamp drive section 8. It should be noted that although not shown in the drawings, inside the exterior housing 2, there are further disposed a cooling device for cooling the inside of the exterior housing 2, and so on.

It should be noted that for the sake of convenience of explanation, the description will hereinafter be presented assuming that the direction of the light emitted from the projector 1 is a +Y direction (a front direction), the upper side of the projector 1 in the horizontal mounting posture is a +Z side, and the right side of the projector 1 in the horizontal mounting posture viewed from the back is a +X side. Further, in the vertical mounting posture, the projector 1 is disposed so that the +X side in the horizontal mounting posture is located on the lower side.

Although the detailed explanation will be omitted, the exterior housing 2 is formed of a plurality of members combined with each other, and is provided with an opening section through which the light modulated passes, an inlet port for taking in the external air, and an exhaust port through which the internal air is discharged. Further, although not shown in the drawings, the exterior housing 2 is provided with an operation panel and a remote control light reception section, and thus, it is arranged that a variety of settings and operations of the projector 1 can be achieved with an operation of the operation panel and a remote controller.

The control circuit section is provided with a central processing unit (CPU), a read only memory (ROM), a random access memory (RAM), and so on to thereby function as a computer, and performs control of the operation of the projector 1, namely control related to projection of an image and control related to an operation of the cooling device, for example.

The optical unit 3 modulates the light, which has been emitted from the discharge lamps 4, in accordance with the image information under the control by the control circuit section, and then projects the light thus modulated on the projection surface.

As shown in FIG. 1, the optical unit 3 is provided with a pair of light source devices 31A, 31B, a reflecting mirror 31C, an illumination optical device 32, a color separation optical device 33, an optical device 34 including a light modulation device described later, a projection lens 35 as a projection optical device, an optical component housing 36 for housing these members 31A, 31B, and 32 through 34 inside.

The light source devices 31A, 31B are disposed across the reflecting mirror 31C from each other so as to emit light toward the reflecting mirror 31C. Further, the light emitted from each of the light source devices 31A, 31B is reflected by the reflecting mirror 31C along an illumination light axis Ax set inside the optical component housing 36, and then the illumination optical device 32 is irradiated with the light.

The illumination optical device 32 is provided with lens arrays 321, 322, a polarization conversion element 323, and an overlapping lens 324. The lens array 321, 322 and the overlapping lens 324 roughly homogenize the light emitted from the light source devices 31A, 31B on the surface of the light modulation device. The polarization conversion element 323 uniforms the random light emitted from the lens array 322 into first linearly polarized light available in the light modulation device.

The color separation optical device 33 is provided with dichroic mirrors 331, 332, and reflecting mirrors 333 through 336, and separates the light having been emitted from the illumination optical device 32 into red light (R light), green light (G light), and blue light (B light).

The optical device 34 is provided with three liquid crystal panels 341 (the liquid crystal panel for the R light is denoted with 341R, the liquid crystal panel for the G light is denoted with 341G, and the liquid crystal panel for the B light is denoted with 341B) as a light modulation device, entrance side polarization plates 342 respectively disposed on the light incident side of the liquid crystal panels 341, exit side polarization plates 343 respectively disposed on the light exit side of the liquid crystal panels 341, and a cross dichroic prism 344 as a color combining optical device.

The liquid crystal panels 341 each have a rectangular image forming area having a plurality of microscopic pixels not shown arranged in a matrix, and each of the pixels is set to the light transmission corresponding to the image information. The colored light separated in the color separation optical device 33 is respectively modulated by the respective liquid crystal panels 341 in accordance with the image information, then combined by the cross dichroic prism 344, and then displayed on a screen or the like (not shown) by the projection lens 35.

The direct-current power supply device 7 converts the alternating-current voltage supplied from an external alternating-current power supply into a constant direct-current voltage.

As will be explained later in detail, the discharge lamp drive section 8 converts the electrical power having the direct-current voltage output from the direct-current power supply device 7 into drive power having alternating current and supplies the discharge lamps 4 with the drive power. Further, the discharge lamp drive section 8 supplies the discharge lamps 4 with the drive power different in level between the horizontal mounting posture (the first posture) and the vertical mounting posture (the second posture) of the projector 1.

Configuration of Light Source Device

Here, the light source devices 31A, 31B will be explained in detail. Since the light source devices 31A, 31B are configured similarly to each other, the explanation will be presented focusing on the light source device 31A.

Figure 2:
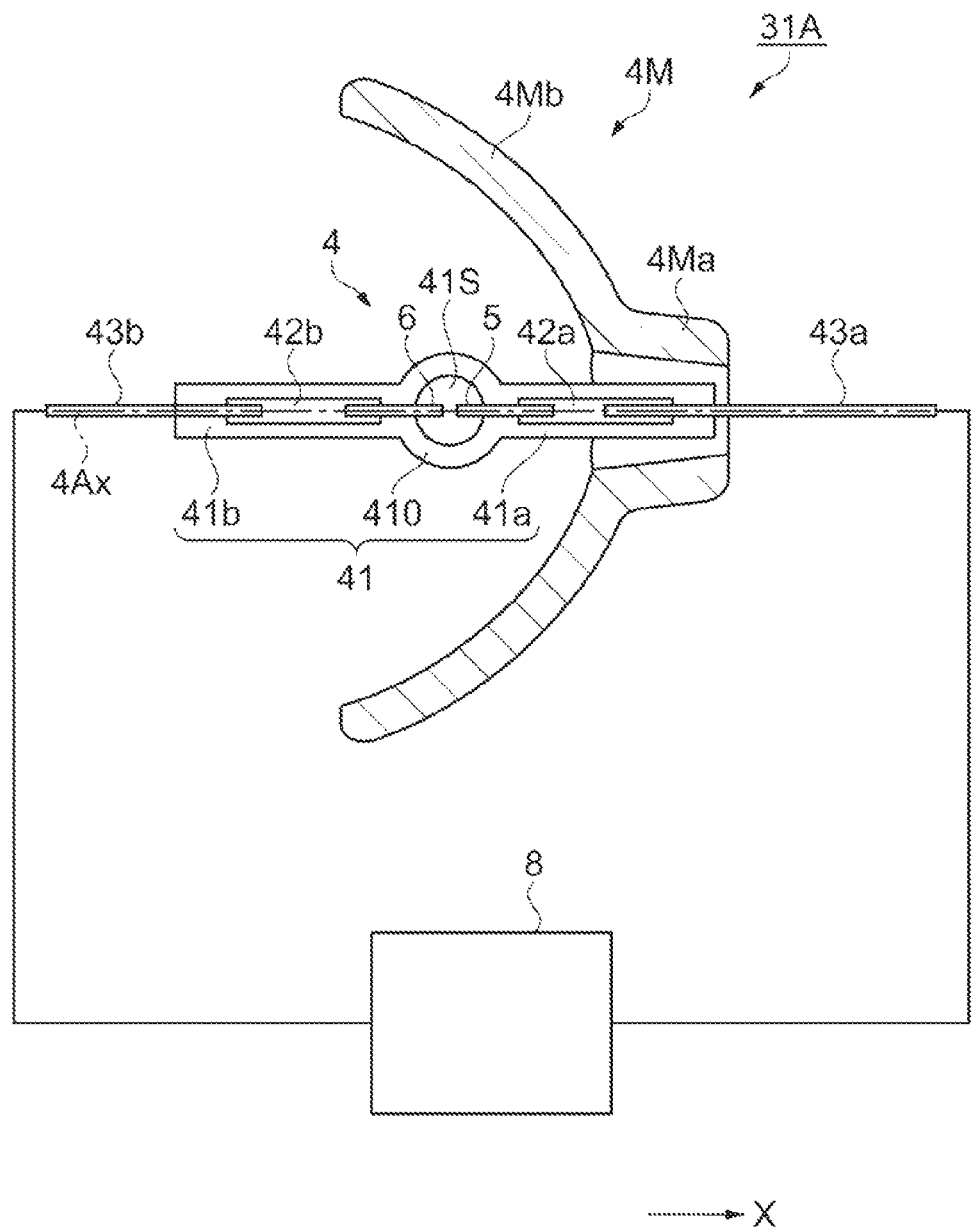
FIG. 2 is a cross-sectional view schematically showing a light source device according to the embodiment.

FIG. 2 is a cross-sectional view schematically showing the light source device 31A.

As shown in FIG. 2, the light source device 31A is provided with the discharge lamp 4 formed of a super-high pressure mercury lamp, a metal halide lamp, or the like, a reflector 4M, and a light source device housing (not shown) for housing the discharge lamp 4 and the reflector 4M.

As shown in FIG. 2, the discharge lamp 4 is provided with a light emitting tube 41, electrodes 5, 6, connection members 42a, 42b, and lead terminals 43a, 43b.

The light emitting tube 41 is formed of a light transmissive material such as quartz glass, and has a light emitting section 410 having a spherical shape disposed at the center, and sealing sections 41a, 41b respectively extending from the both sides of the light emitting section 410 as shown in FIG. 2.

Inside the light emitting section 410, there is disposed a discharge space 41S encapsulating mercury, noble gas, halogen, and so on.

The pair of electrodes 5, 6 are each formed of a high-melting point metal material such as tungsten, and are disposed so that respective one ends are closely opposed to each other in the discharge space 41S. Further, the pair of electrodes 5, 6 are disposed along a light source optical axis 4Ax of the discharge lamp 4.

The connection members 42a, 42b are each formed of a material such as molybdenum foil. The connection member 42a has one end connected to the electrode 5, and is disposed inside the sealing section 41a, and the connection member 42b has one end connected to the electrode 6, and is disposed inside the sealing section 41b.

The lead terminals 43a, 43b are each formed of a material such as tungsten. The lead terminal 43a has one end connected to the connecting member 42a and the other end connected to the discharge lamp drive section 8 from the outside of the sealing section 41a, and the lead terminal 43b has one end connected to the connecting member 42b and the other end connected to the discharge lamp drive section 8 from the outside of the sealing section 41b. Further, when the electrical power is supplied to the lead terminals 43a, 43b from the discharge lamp drive section 8, discharge occurs between the electrodes 5, 6 opposed to each other, and thus the discharge lamp 4 emits light.

As shown in FIG. 2, the reflector 4M has a neck-like section 4Ma having a cylindrical shape, and a reflecting section 4Mb extending from the neck-like section 4Ma so as to have a roughly concave cross-sectional shape.

The neck-like section 4Ma is provided with an insertion hole in which the sealing section 41a is inserted, and the discharge lamp 4 has the sealing section 41b located on the opposite side to the neck-like section 4Ma, and is fixed to the reflector 4M with an adhesive injected between the sealing section 41a and the insertion hole.

The reflecting section 4Mb has an internal surface on which a metal thin film is evaporated, and reflects the light, which has been emitted from the light emitting section 410, toward the opposite side to the neck-like section 4Ma.

It should be noted that the light source devices 31A, 31B can also be configured so as to be provided with a secondary reflecting mirror disposed so as to cover a curved surface on the opposite side to the side where the neck-like section 4Ma is disposed with respect to the light emitting section 410, and for reflecting the light, which has been emitted from the light emitting section 410, toward the reflecting section 4Mb.

Further, the vicinities of the electrodes 5, 6 of the discharge lamp 4 will be explained in detail.

Figure 3:
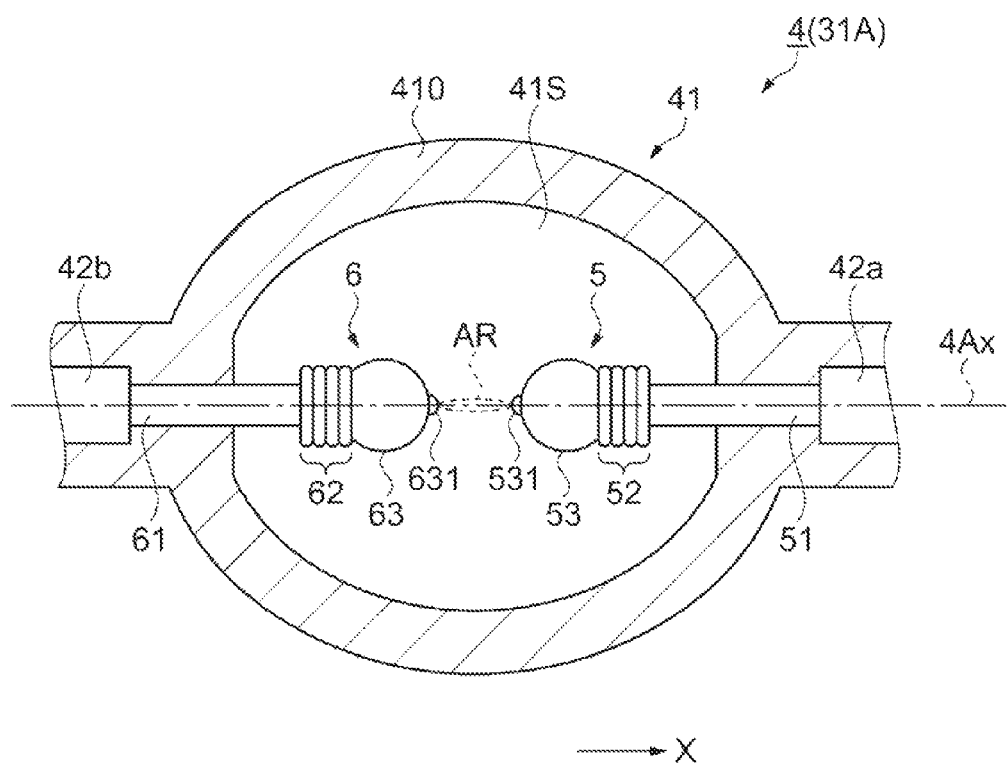
FIG. 3 is a cross-sectional view showing the vicinity of a light emitting section of a discharge lamp according to the embodiment.

FIG. 3 is a cross-sectional view showing the vicinity of the light emitting section 410 of the discharge lamp 4.

As shown in FIG. 3, the electrode 5 has a core rod 51, a coil section 52, and a main body section 53. In a stage prior to the encapsulation into the light emitting section 410, the electrode 5 is formed by winding a wire made of an electrode material (e.g., tungsten) around the core rod 51 to form the coil section 52, and then heating to melt the coil section 52 thus formed. Thus, the main body section 53 having a high thermal capacity is formed on the tip side of the electrode 5. Similarly to the electrode 5, the electrode 6 also has the core rod 61, a coil section 62, and a main body section 63, and is formed similarly to the electrode 5.

When the discharge lamp 4 is supplied with the drive power described later, projections 531, 631 are provided respectively to the tips of the main body sections 53, 63 as shown in FIG. 3. Further, arc discharge AR occurs between the projections 531, 631, and the discharge lamp 4 emits the light. Specifically, since the projections 531, 631 are maintained, the arc discharge AR is stabilized, and the discharge lamp 4 efficiently emits the light. Further, the projections 531, 631 are maintained after the discharge lamp 4 is put off.

As shown in FIG. 1, the light source devices 31A, 31B are disposed so that the respective light source optical axes 4Ax extend along the same direction (±X directions). In other words, the light source devices 31A, 31B are disposed so that the light source optical axes 4Ax extend along a direction perpendicular to the projection optical axis 35Ax of the projection lens 35. Further, the light source devices 31A, 31B are arranged so that the light source optical axes 4Ax extend along the roughly horizontal plane in the horizontal mounting posture (the first posture), and are arranged so that the light source optical axes 4Ax intersect with the roughly horizontal plane and extend along the vertical direction in the vertical mounting posture (the second posture). Further, the projector 1 projects a landscape image in the horizontal mounting posture, and projects a portrait image in the vertical mounting posture obtained by rotating the horizontal mounting posture around the center axis extending in a direction along the projection optical axis 35Ax as much as 90°. Further, each of the light source devices 31A, 31B is configured so as to be replaced from the outside of the exterior housing 2.

Configuration of Discharge Lamp Drive Section

Then, a principal configuration of the discharge lamp drive section 8 will be explained.

The discharge lamp drive section 8 supplies the electrodes 5, 6 with a drive current I to put on the discharge lamp 4.

Figure 4:
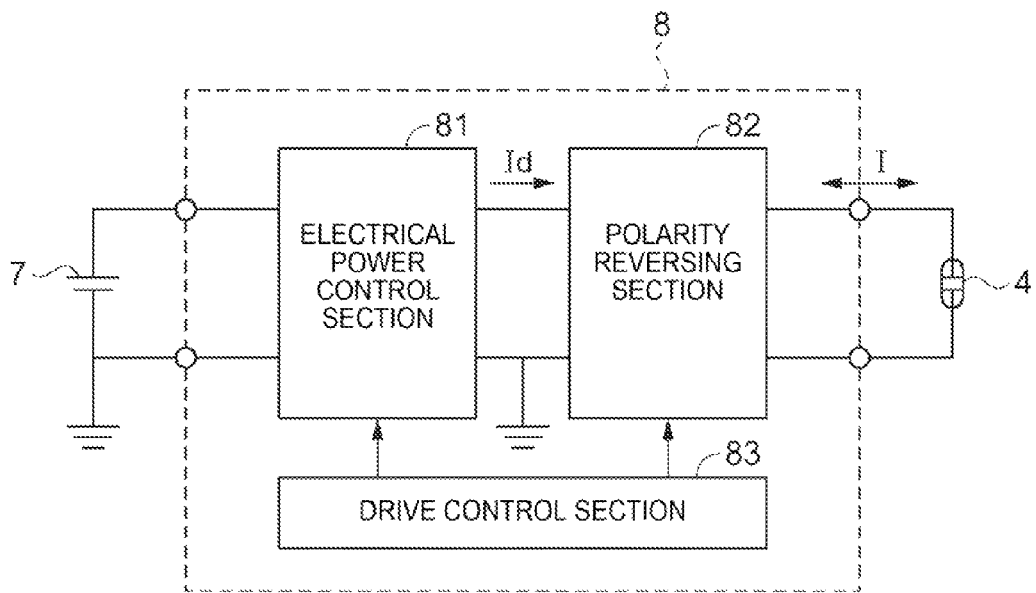
FIG. 4 is a block diagram showing a schematic configuration of a discharge lamp drive section according to the embodiment.

FIG. 4 is a block diagram showing a schematic configuration of the discharge lamp drive section 8.

As shown in FIG. 4, the discharge lamp drive section 8 is provided with an electrical power control section 81, a polarity reversing section 82, and a drive control section 83.

The electrical power control section 81 is configured including, for example, a step-down chopper circuit, and steps down the direct-current voltage output from the direct-current power supply device 7 to output the direct current Id.

The polarity reversing section 82 is configured including, for example, an inverter bridge circuit (a full-bridge circuit), and reverses the polarity of the direct current Id, which has been output from the electrical power control section 81, at predetermined timings to thereby generate the drive current I having an arbitrary frequency, and then outputs the drive current I to the discharge lamp 4.

The drive control section 83 controls the electrical power control section 81 and the polarity reversing section 82 to thereby control the current value, the frequency, and so on of the drive current I. Specifically, the drive control section 83 controls the current value of the direct current Id with respect to the electrical power control section 81, and controls the timings of the polarization reversing of the drive current I and so on with respect to the polarization reversing section 82. It should be noted that the drive control section 83 can be formed of a dedicated circuit, or can also be configured so as to be included in the control circuit section.

As described above, the discharge lamp drive section 8 generates the drive power having the drive current I, and then supplies the electrodes 5, 6 with the drive power via the lead terminals 43a, 43b. The temperature of an anode, which the electrons collide with, becomes apt to be higher compared with the temperature of a cathode emitting the electrons. However, since the polarities of the electrodes 5, 6 are reversed alternately as described above, The state in which the temperature of one electrode is excessively higher than the temperature of the other electrode is inhibited from lasting. Further, since the electrodes 5, 6 are supplied with the appropriate drive power, the projections 531, 631 are maintained due to the halogen cycle.

Further, it is also possible to configure the discharge lamp drive section 8 so as to supply the discharge lamp 4 with the drive current I varying in frequency.

Figure 5:
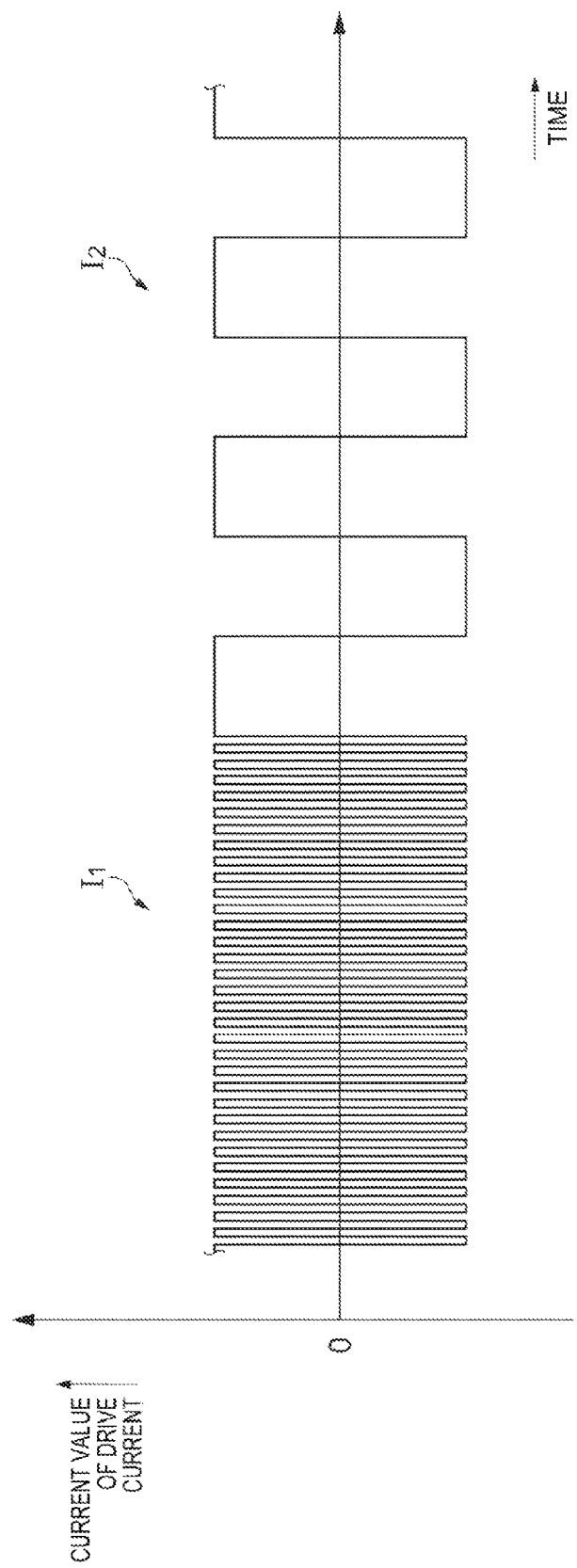
FIG. 5 is a diagram showing an example of a waveform of a drive current to be supplied to the discharge lamp according to the embodiment.

FIG. 5 is a diagram showing an example of a waveform of the drive current I to be supplied to the discharge lamp 4.

As shown in, for example, FIG. 5, the discharge lamp drive section 8 generates the drive current I including a first drive current $I_1$ (an alternating current at a high frequency), which is formed of a rectangular wave, and a second drive current $I_2$ (an alternating current at a low frequency), which is formed of a rectangular wave and is lower in frequency than the first drive current $I_1$, repeating alternately, and then supplies the discharge lamp 4 with the drive current I. For example, the frequency of the first drive current $I_1$ is a frequency exceeding 1 kHz, and the frequency of the second drive current $I_2$ is set to a frequency equal to or lower than 500 Hz. It should be noted that the drive current I is not limited to the rectangular wave, but can also be, for example, a sinusoidal wave or a triangular wave. Further, the drive current I can be formed to have a waveform in which an alternating current and a direct current are repeated alternately.

Further, although not shown in the drawings, it is possible to adopt a configuration in which an alternating current at a low frequency (e.g., 5 through 200 Hz) is periodically inserted in an alternating current at a stationary frequency (e.g., 60 Hz through 1 kHz) for a short time (e.g., a half cycle or several cycles). It should be noted that in the case of the configuration of inserting the alternating current at the low frequency for a half cycle, it is also possible to adopt a configuration of inserting the alternating currents with polarities different alternately from each other.

By supplying the discharge lamp 4 with the drive current I varying in frequency in such a manner as described above, it becomes possible to control the time in which the electrodes 5, 6 become the anode or the cathode to control the excessive melting or thinning of the projections 531, 631 to thereby maintain the projections 531, 631.

Drive Power of Discharge Lamp

In order to suppress the deterioration of the discharge lamp 4, the range of the drive power also becomes a limited range. Further, the projector 1 is configured so as to be able to be driven in a mode selected from a plurality of modes such as an energy saving mode for setting the light emission luminance of the discharge lamp 4 lower to drive the discharge lamp 4 with low power to reduce the power consumption and a high luminance mode for setting the light emission luminance of the discharge lamp 4 higher to drive the discharge lamp 4 with high power (e.g., the rated power) to thereby project a brighter image compared to the energy saving mode in the horizontal mounting posture (the first posture). In other words, the discharge lamp 4 is provided with the drive power different in level between the energy saving mode and the high luminance mode.

Figure 6:
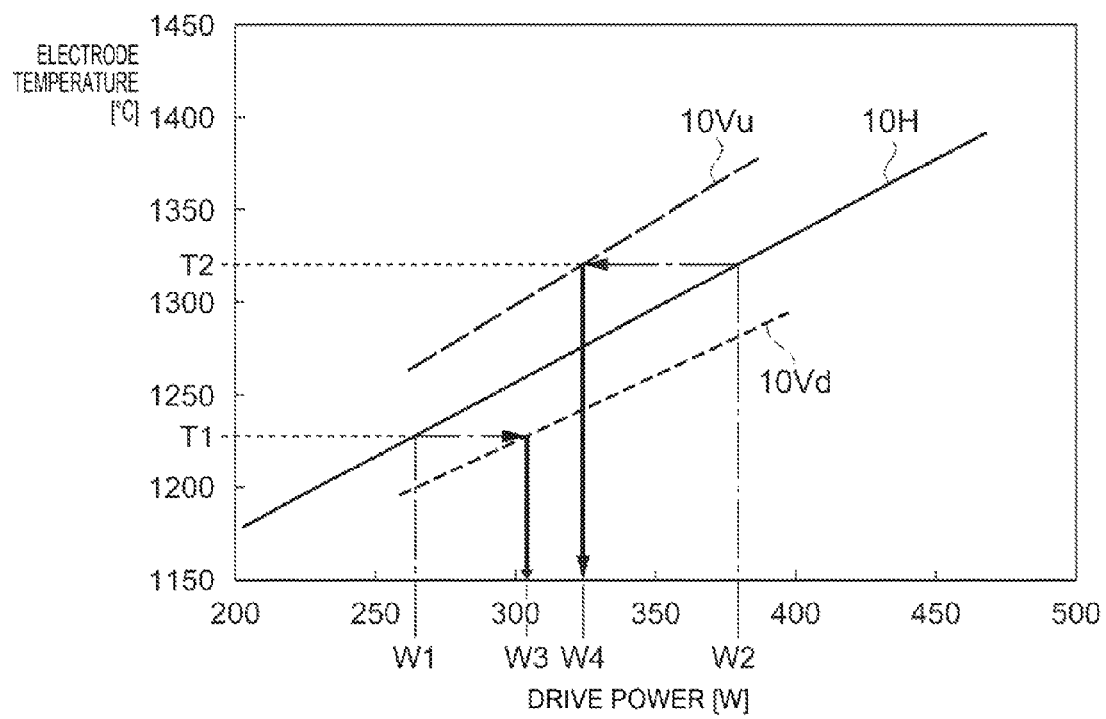
FIG. 6 is a graph showing an example of a relationship between drive power and the temperature of an electrode in the embodiment.

FIG. 6 is a graph showing an example of the relationship between the drive power W and the temperature of the electrodes 5, 6, and is a graph based on data measured using a non-contact thermometer (e.g., a radiation thermometer).

Since the light source devices 31A, 31B are disposed so that the light source optical axes 4Ax extend along the roughly horizontal plane in the horizontal mounting posture, in the case of supplying the discharge lamp 4 with the drive power in which the average power value in the period with the electrode 5 acting as the anode and the average power value in the period with the electrode 6 acting as the anode are roughly equivalent to each other, the temperature of the electrode 5 and the temperature of the electrode 6 rise in roughly the same manner. Further, as shown in FIG. 6, the curve 10H representing the relationship between the drive power W in the horizontal mounting posture and the temperature of the electrodes 5, 6 becomes a curve, which can approximate to a linear function representing the fact that the higher the drive power W is, the higher the temperature is.

In contrast, since the light source devices 31A, 31B are disposed in the vertical mounting posture so that the light source optical axes 4Ax extend along the vertical direction, the electrodes 5, 6 are also arranged along the vertical direction. In other words, in the vertical mounting posture in which the +X side (see FIG. 1) is located on the lower side, the light source device 31A is disposed so that the electrode 6 is located above the electrode 5, and the light source device 31B is disposed so that the electrode 5 is located above the electrode 6.

In the discharge lamp, there occurs the convection in the discharge space 41S due to the arc discharge AR between the electrodes 5, 6, and the upper side becomes higher in temperature than the lower side. Therefore, the electrode 6 becomes higher in temperature than the electrode 5 in the light source device 31A, and the electrode 5 becomes higher in temperature than the electrode 6 in the light source device 31B.

Specifically, the curve 10Vu representing the relationship between the drive power W and the temperature of one of the electrodes 5, 6 located on the upper side in the vertical mounting posture becomes a curve, which can approximate to a linear function located on the higher temperature side of the curve 10H representing the relationship between the drive power W and the temperature of the electrodes 5, 6 in the horizontal mounting posture. Further, the curve 10Vd representing the relationship between the drive power W and the temperature of one of the electrodes 5, 6 located on the lower side in the vertical mounting posture becomes a curve, which can approximate to a linear function located on the lower temperature side of the curve 10H.

The discharge lamp drive section 8 selectively performs the energy saving mode (first drive) for driving the discharge lamp 4 with first drive power W1, which is relatively low power, and the high luminance mode (second drive) for driving the discharge lamp 4 with second drive power W2, which is higher than the first drive power W1, and is relatively high power, based on the operation of the user with the operation panel or the remote controller in the horizontal mounting posture. In the present embodiment, as shown in FIG. 6, the first drive power W1 is set to about 260 W (watt), the second drive power W2 is set to about 380 W (watt), for example.

As shown in FIG. 6, the electrodes 5, 6 in the horizontal mounting posture are set to first temperature T1 in the case of the first drive with the first drive power W1, and are set to second temperature T2 in the case of the second drive with the second drive power W2. The temperature of the electrodes 5, 6 in a range no lower than the first temperature T1 and no higher than the second temperature T2 is the temperature at which the deterioration of the electrodes 5, 6 is suppressed, and the discharge lamp 4 efficiently emits the light. Specifically, when the electrodes 5, 6 reach the temperature exceeding the second temperature T2, excessive melting of the projections 531, 631 occurs, and when the electrodes 5, 6 reach the temperature lower than the first temperature T1, there occur thinning of the projections 531, 631, blackening of the interior wall of the light emitting section 410, and so on, and thus there occur the degradation of the luminance and the flicker of the discharge lamp 4. However, if the electrodes 5, 6 are at the temperature within the range no lower than the first temperature T1 and no higher than the second temperature T2, such deterioration can be suppressed.

Further, as shown in FIG. 6, the discharge lamp drive section 8 supplies the discharge lamp 4 with the drive power W in a range no lower than third drive power W3 and no higher than fourth drive power W4 having a level in between the first drive power W1 and the second drive power W2 in the vertical mounting posture.

Specifically, the third drive power W3 is the drive power with which one of the pair of electrodes 5, 6 located on the lower side in the vertical mounting posture reaches the temperature corresponding to the first temperature T1 of the electrodes 5, 6 in the first drive in the horizontal mounting posture.

Further, the fourth drive power W4 is the drive power with which one of the pair of electrodes 5, 6 located on the upper side in the vertical mounting posture reaches the temperature corresponding to the second temperature T2 of the electrodes 5, 6 in the second drive in the horizontal mounting posture.

In the present embodiment, the third drive power W3 is set to about 310 W (watt), the fourth drive power W4 is set to about 325 W (watt), for example.

As described above, since the electrodes 5, 6 are set to the temperature no lower than the first temperature T1 and no higher than the second temperature T2 even in the vertical mounting posture, the discharge lamp 4 is suppressed in deterioration, and efficiently emits the light. Further, in the vertical mounting posture, it is also possible to define that the case of supplying the third drive power W3 is the energy saving mode, and the case of supplying the fourth drive power W4 is the high luminance mode, and it is also possible to adopt a configuration in which the drive power can be varied between the third drive power W3 and the fourth drive power W4.

It should be noted that it is also possible to adopt a configuration in which the projector 1 is provided with a detection section for detecting the posture, and the switching of the drive power W between the period of the horizontal mounting posture and the period of the vertical mounting posture is performed based on the detection result of the detection section. Further, it is also possible to adopt a configuration in which the light source housing of the light source devices 31A, 31B is formed to have a shape different between one for the horizontal mounting posture and one for the vertical mounting posture, a detection section for detecting the difference is disposed inside the projector 1, and the drive power W is switched based on the detection result of the detection section. Further, it is also possible to adopt a configuration in which the drive power W is switched based on the operation of the user with the operation panel or the remote controller.

Further, the tilt of the curve representing the relationship between the drive power W and the temperature of the electrodes 5, 6 varies in accordance with the sizes of the members constituting the discharge lamp 4, the types of the materials used for the members, and so on.

Figure 7:
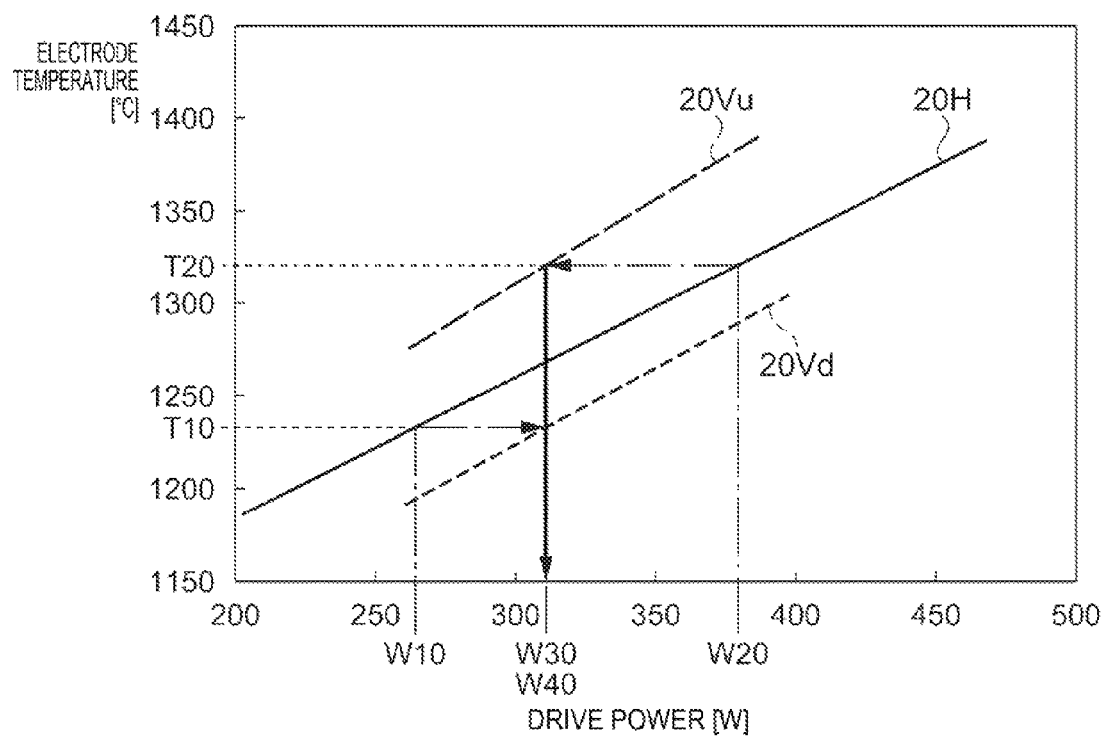
FIG. 7 is a graph showing an example of another relationship between drive power and the temperature of an electrode in the embodiment.

FIG. 7 is a graph showing an example of another relationship between the drive power W and the temperature of the electrodes, and is a graph showing the relationship corresponding to a discharge lamp different in type from the discharge lamp 4 explained with reference to FIG. 6. In FIG. 7, the curve 20H is a curve representing the relationship between the drive power W and the temperature of the electrodes in the horizontal mounting posture, the curve 20Vu is a curve representing the relationship between the drive power W and the temperature of the electrode located on the upper side in the vertical mounting posture, and the curve 20Vd is a curve representing the relationship between the drive power W and the temperature of the electrode located on the lower side in the vertical mounting posture.

As shown in FIG. 7, although the positional relationship, in which the curve 20Vu is located on the higher temperature side of the curve 20H and the curve 20Vd is located on the lower temperature side of the curve 20H, is similar to the relationship shown in FIG. 6, the gradients of the curves 20H, 20Vu, and 20Vd are different from those of the curves 10H, 10Vu, and 10Vd shown in FIG. 6.

Further, as shown in FIG. 7, in the horizontal mounting posture, the discharge lamp drive section 8 supplies the discharge lamp with first drive power W10 in the period of the energy saving mode (the first drive), and supplies the discharge lamp with second drive power W20 in the period of the high luminance mode (the second drive). As shown in FIG. 7, the electrodes in the horizontal mounting posture are set to first temperature T10 in the case of the first drive in which the first drive power W10 is supplied, and are set to second temperature T20 in the case of the second drive in which the second drive power W20 is supplied. The temperature of the electrodes 5, 6 in a range no lower than the first temperature T10 and no higher than the second temperature T20 is the temperature at which the deterioration of the electrodes is suppressed, and the discharge lamp efficiently emits the light similarly to the temperature in the range no lower than the first temperature T1 and no higher than the second temperature T2 described above.

Further, in the vertical mounting posture, the discharge lamp drive section 8 supplies the discharge lamp with the drive power no lower than third drive power W30, with which the electrode on the lower side is set to the temperature corresponding to the first temperature T10 of the electrodes in the horizontal mounting posture, and no higher than fourth drive power W40, with which the electrode on the upper side is set to the temperature corresponding to the second temperature T20 of the electrodes in the horizontal mounting posture, as shown in FIG. 7. In this discharge lamp, the third drive power W30 and the fourth drive power W40 are set to roughly the same value of about 310 W (watt).

As described hereinabove, according to the present embodiment, the following advantages can be obtained.

(1) Since the first drive power W1 and the second drive power W2 are set so that the electrodes 5, 6 are set to the temperature at which the deterioration of the electrodes 5, 6 is suppressed in the horizontal mounting posture, it is possible for the projector 1 to, for example, project the image in the energy saving mode in the case of supplying the first drive power W1 and project the brighter image in the high luminance mode in the case of supplying the second drive power W2.

Further, the discharge lamp drive section 8 supplies the discharge lamp with the drive power W no lower than the third drive power W3 and no higher than the fourth drive power W4 in the vertical mounting posture. Thus, the discharge lamp 4 is put on at the temperature at which the deterioration of the electrodes 5, 6 is suppressed even in the vertical mounting posture.

Therefore, it becomes possible to provide the projector 1 projecting an image with a desired brightness for a long period of time in both of the horizontal mounting posture and the vertical mounting posture.

(2) Since the deterioration of the discharge lamp 4 is suppressed in the direction in which the light source optical axes 4Ax extend along the horizontal plane and in the direction in which the light source optical axes 4Ax extend along the vertical direction, it becomes possible for the projector 1 to stably project a landscape image in the horizontal mounting posture and a portrait image in the vertical mounting posture for a long period of time.

(3) The projector 1 is provided with the plurality of light source devices 31A, 31B having the light source axes 4Ax disposed along the same direction, and the plurality of light source devices 31A, 31B is supplied with the drive power W described above in accordance with the posture of the projector 1. Thus, it becomes possible to provide the projector 1 capable of projecting an image improved in brightness for a long period of time in both of the horizontal mounting posture and the vertical mounting posture.

Modified Examples

It should be noted that the embodiment described above can be modified as follows.

Although the projector 1 according to the embodiment described above has the light source devices 31A, 31B arranged so that the light source optical axes 4Ax extend along the direction perpendicular to the projection optical axis 35Ax of the projection lens 35, it is also possible to adopt a configuration in which the light source devices 31A, 31B are arranged so that the light source optical axes 4Ax extend along a direction parallel to the projection optical axis 35Ax of the projection lens 35. In the case of this configuration, since the deterioration of the discharge lamp is suppressed even in the posture with the projector rotated around the center axis extending along the direction perpendicular to the projection optical axis 35Ax, it becomes possible for the projector to perform stable projection within the range in which the projector is rotated 360° centered on the center axis. Therefore, it becomes possible to provide the projector, which can be installed so as to correspond to a variety of scenes.

Although in the embodiment described above, the posture in which the projector is disposed so that the light source optical axes 4Ax extend along the vertical direction is defined as the second posture, any posture in which the light source optical axes 4Ax intersect with the horizontal plane can also be defined as the second posture.

Although the projector according to the embodiment described above is provided with the two light source devices 31A, 31B, the invention is not limited thereto, and a configuration provided with one light source device or more than two light source devices can also be adopted.

Although in the projector 1 according to the embodiments described above, the transmissive liquid crystal panel 341 is used as the light modulation device, one using a reflective liquid crystal panel can also be adopted.

Further, although the light modulation device according to the embodiment described above adopts a so-called three-panel system using the three light modulation devices corresponding respectively to the R light, the G light, and the B light, the invention is not limited thereto, but a single-panel system can also be adopted, or the invention can also be applied to a projector provided with two or more than three light modulation devices.

Further, the those using a micromirror light modulation device such as digital micromirror device (DMD) as the light modulation device can also be adopted.

The entire disclosure of Japanese Patent Application No. 2014-065436, filed Mar. 27, 2014 is expressly incorporated by reference herein.

What is claimed is:

1. A projector comprising:
  a discharge lamp having a pair of electrodes disposed along an optical axis; and
  a discharge lamp drive section adapted to supply drive power to the discharge lamp to drive the discharge lamp,
  wherein the discharge lamp drive section is configured to selectively perform a first drive in which a first drive power is supplied to the discharge lamp and a second drive in which a second drive power higher than the first drive power is supplied to the discharge lamp in a first posture of the projector in which the optical axis of the discharge lamp extends along a horizontal plane, and
  supply drive power not lower than a third drive power and not higher than a fourth drive power to the discharge lamp in a second posture of the projector in which the optical axis intersects with the horizontal plane,
  the third drive power is drive power with which one of the pair of electrodes located on a lower side in a vertical direction in the second posture is set to temperature corresponding to first temperature of the electrode in the first drive in the first posture, and
  the fourth drive power is drive power with which one of the pair of electrodes located on an upper side in the vertical direction in the second posture is set to temperature corresponding to second temperature of the electrode in the second drive in the first posture.

2. The projector according to claim 1, wherein
  the second posture is a posture in which the optical axis extends along the vertical direction.

3. The projector according to claim 1, wherein
  the discharge lamp includes a plurality of discharge lamps having respective optical axes disposed along one direction, and
  the discharge lamp drive section is configured to selectively supply the first drive power and the second drive power to the plurality of discharge lamps in the first posture, and supply the drive power not lower than the third drive power and not higher than the fourth drive power to the plurality of discharge lamps in the second posture.

* * * * *